March 2, 1954 H. J. MATTESON 2,670,609
REFRIGERANT CONTROL SYSTEM
Filed March 15, 1950 2 Sheets-Sheet 1
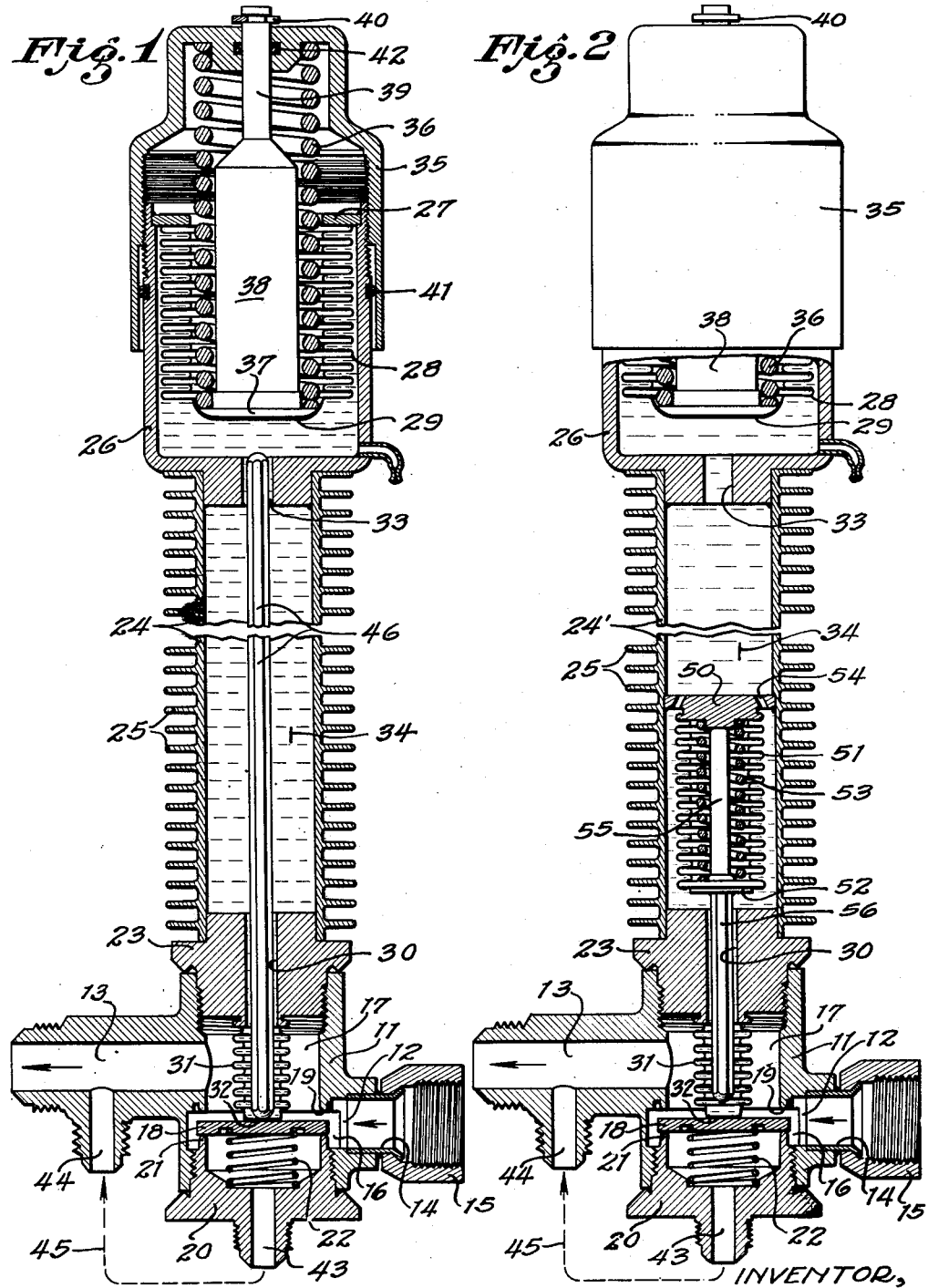
INVENTOR,
HAROLD J. MATTESON
By John H. Rouse,
ATTORNEY.

March 2, 1954  H. J. MATTESON  2,670,609
REFRIGERANT CONTROL SYSTEM
Filed March 15, 1950  2 Sheets-Sheet 2

INVENTOR,
HAROLD J. MATTESON
By John H. Rouse,
ATTORNEY.

Patented Mar. 2, 1954

2,670,609

UNITED STATES PATENT OFFICE 2,670,609

REFRIGERANT CONTROL SYSTEM

Harold J. Matteson, Glendale, Calif., assignor to General Controls Co., Glendale, Calif., a corporation of California Application March 15, 1950, Serial No. 149,693

11 Claims. (Cl. 62—8)

My present invention relates to refrigeration systems of the mechanical type wherein a conventional expansion valve, having means responsive to the temperature at the outlet of the cooling unit, is employed for maintaining the desired degree of superheat in the unit. In a multiple-unit refrigeration system of this type it is customary to provide an individual expansion valve for each unit, and a thermostatically controlled valve ahead of each expansion valve for controlling flow of refrigerant to the unit in accordance with the temperature desired in the space cooled by the unit.

This invention, in one of its phases, relates more particularly to improvements in multiple-unit refrigeration systems of the general character described, and it is an object of the invention to eliminate the conventional thermostatically controlled valve and to effect thermostatic control of the refrigerant through the medium of the expansion valve itself. I accomplish this object by the provision of a thermostatic valve, responsive to space temperature and interposed between the expansion valve and the cooling unit, through which refrigerant normally can pass substantially unrestrictedly; and means for diverting flow of refrigerant through this thermostatic valve into thermal-transfer relation to the temperature responsive means of the expansion valve when the cooling requirements of the space are satisfied, so that closing of the expansion valve is thereby effected.

Another object of this invention is to provide a novel thermostatic control valve which, while not so limited, has particular utility in a system of the character described in the preceding object.

Another object is to provide a valve having a thermostatic operator of the fluid-charged type, and means operable in the event of leakage of the thermostatic fluid for locking the valve in a predetermined "safe" position; an ancillary object being to effect the locking operation automatically.

For full understanding of the invention, and further appreciation of its objects and advantages, reference is to be had to the following detailed description and accompanying drawing, and to the appended claims.

In the drawing:

Figure 1 is a sectional view of a thermostatic control valve according to my invention;

Figure 2 is a modified form of the valve shown in Fig. 1; and

Figure 3:
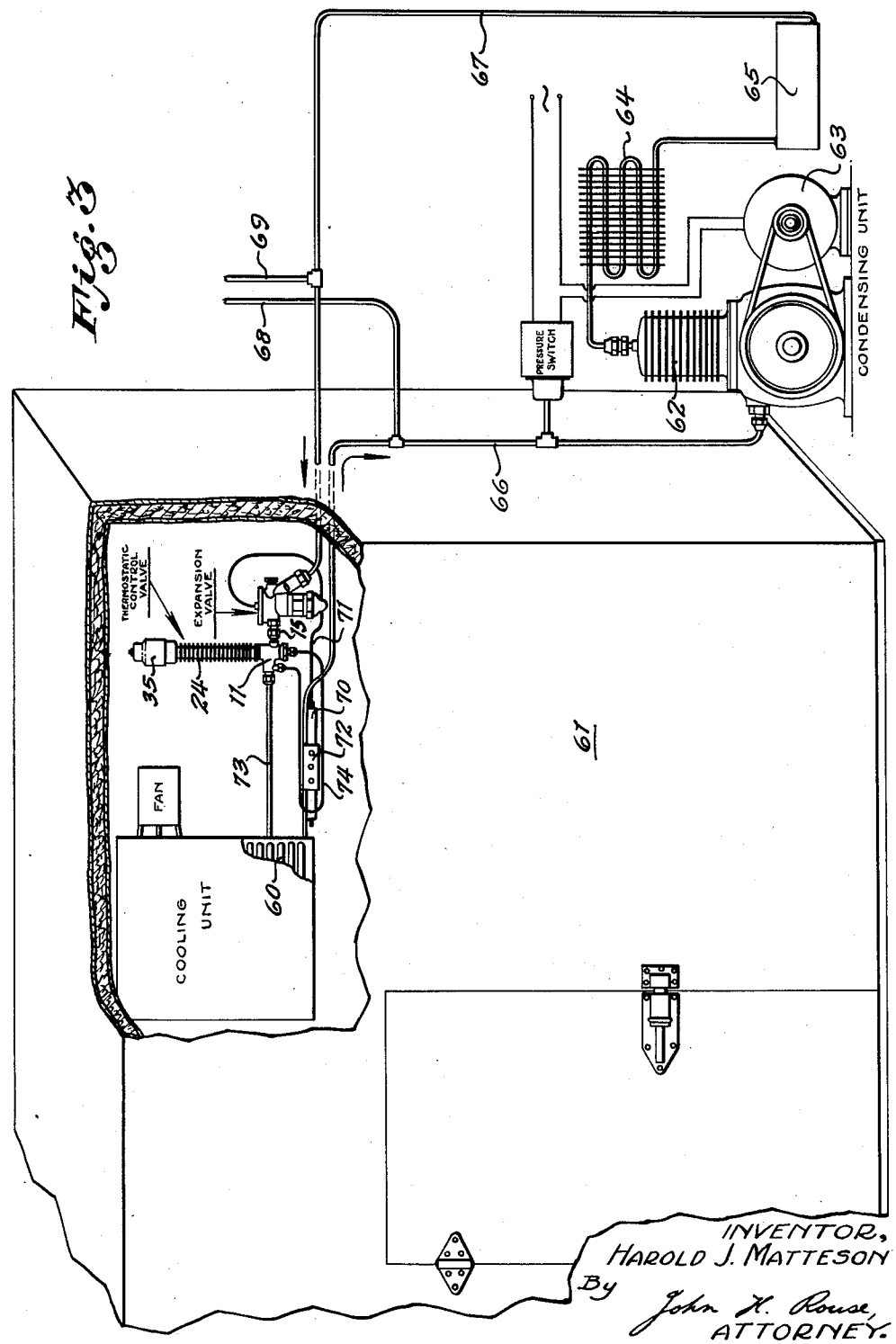
Figure 3 is a generally schematic view of a refrigeration system embodying this invention and including a thermostatic control valve of the type shown in Figs. 1 and 2.

Referring first more particularly to Fig. 1, the numeral 11 indicates a valve casing having an inlet 12 and a main outlet 13. In the inlet 12 is a connector comprising a flared tube 14, soldered to the casing, and a cooperating threaded fitting 15. Between the inlet and main outlet of the casing is a pair of chambers 16 and 17, communication between which is controlled by a disk-like closure 18 cooperable with an annular seat 19 formed around the entrance to the upper chamber 17. Threaded in an opening through the bottom wall of the lower chamber 16 is a hollow fitting 20 whose upper end forms a lower seat 21 for the closure. The closure 18 is biased upwardly by the force of a compression spring 22; the opposite ends of this spring fitting in an annular groove in the underside of the closure and in a recess in the bottom of fitting 20 so that the spring also serves to prevent lateral movement of the closure of more than a slight amount.

Threaded in an opening, above chamber 17, through a thickened portion of the valve casing is a member 23 to which an elongated hollow cylinder 24 is secured as by solder; the cylinder having on its outside a plurality of fins 25 to increase thermal transfer between it and the surrounding atmosphere. Fitting in the top of cylinder 24, and secured thereto by solder, is a cup-shaped member 26 in whose upper end or mouth a centrally-apertured disk 27 is soldered. Depending from this disk is an expansible-contractible metallic bellows 28 having an integrally formed bottom wall 29; the open upper end of the bellows being joined to disk 27 by solder.

The member 23 at the lower end of cylinder 24 has a central opening 30 which communicates with the interior of another expansible-contractible metallic bellows 31 secured by its open top end to the underside of member 23 and having an integral bottom wall 32. Through the bottom wall of the cup-shaped member 26 is another opening 33, so that the interior of member 26 (around bellows 28), the interior of cylinder 24, and the interior of bellows 31 together form a continuous sealed chamber which is indicated as a whole by numeral 34.

The chamber 34 contains thermally expansive fluid, as indicated by the short horizontal lines, which in the structure illustrated is preferably in the form of a complete or "solid" fill of liquid such as ethyl ether. However, as will be obvious to workers in the art, the thermally expansive fluid may, under some conditions, be an elastic charge or partial fill of volatile liquid such as methyl chloride.

Adjustably threaded on the upper part of the cup-shaped member 26 is a cap 35 between whose top wall and the end wall 29 of bellows 28 is a compression spring 36; the foot 37 of a cylindrical member or plunger 38 being interposed between the spring and the bellows end-wall. The plunger 38 is reduced in diameter at its upper end to form a stem 39 which extends freely through an opening in the top of the cap; the outer end of the stem being grooved to receive a snap-ring or C-washer 40. To guard against entry of moisture or dirt, seals of the O-ring type are provided between cap 35 and member 26 and between stem 39 and the cap, as indicated at 41 and 42 respectively.

The parts are shown in Fig. 1 in the positions which they assume when the temperature of the fluid in the thermostatic chamber 34 is somewhat higher than that for which the operator is set; the lower bellows 31 being fully expanded so that closure 18 is thereby held in tight engagement with its lower seat 21; the upper bellows 28 being slightly compressed so that plunger 38 is raised and there is clearance between washer 40 and the top of cap 35.

The force of spring 36 urging wall 29 of the upper bellows downwardly is considerably greater than the force of spring 22 which, through the closure disk, urges wall 32 of the lower bellows upwardly. Consequently, with reduction of temperature and volume of the thermostatic fluid the wall 29 of the upper bellows falls to a position wherein its farther downward movement is arrested by engagement of washer 40 with the top of cap 35; continued reduction of temperature and volume of the fluid effecting upward movement of wall 32 of the lower bellows, so that under the force of spring 22 closure 18 is brought into engagement with its upper seat 19. In that position of the closure, flow through the valve is diverted from the main outlet 13 to a supplemental outlet 43 formed in the bottom of fitting 20. For a purpose hereinafter to be described, the valve casing has an additional passage 44 which, as is indicated by the broken line 45, may serve for passing to the main outlet fluid flowing from the supplemental outlet 43.

In normal operation of the valve the closure disk 18 is moved, by bellows 31 and bias spring 22, from engagement with one of its seats 19 and 21 into engagement with the other, in accordance with the expansion and contraction of the fluid in chamber 34. In such normal operation, no movement of the upper bellows 28 occurs because of the relative stiffness of spring 36 which functions as a static loading spring and yields only when the temperature of the thermostatic unit rises considerably above that for which it is set. By the arrangement disclosed, and because of the large area of the upper bellows 28, over-travel of the upper bellows is permitted even if the device is subjected to relatively high temperatures in shipment, or before installation in a control system for which it is adapted. Further, when the valve is employed in such as a refrigeration system, if pressure in the valve casing acting upwardly on the lower bellows 31 becomes excessive, by the arrangement disclosed the end wall of that bellows can rise to effect closing of the valve main-outlet, even if the chamber 34 contains a solid fill of liquid.

By manipulation of the cap 35 the effective volume of chamber 34 can be increased or decreased to adjust the setting of the thermostatic operator. The cap 35 also serves another purpose: In the event that the thermostatic unit becomes defective due to substantial leakage of fluid from chamber 34, by screwing the cap downwardly the end wall 29 of the upper bellows is then moved downwardly therewith; the spring 36 remaining in its fully expanded condition (which is limited by washer 40 on stem 39) since, due to the leakage of fluid, there is no appreciable opposition to the expansion of the bellows. When the bellows wall 29 is close to the bottom of the cup-shaped member 26 it engages the tip of a rod 46 whose other end bears (by gravity) against the end wall 32 of the lower bellows; farther downward adjustment of cap 35 causing closure 18 to be forced into engagement with its lower seat, so that the valve is locked in this condition. The rod 46 is a loose fit in openings 30 and 33, and is preferably hexagonal in cross-section so that it does not impede normal flow through these openings. In normal thermostatic operation of the valve the rod 46 obviously has no utility. If the thermostatic fluid in chamber 34 is of the type which provides an elastic charge, the means described above for locking the valve in one position can be effective irrespective of leakage of the fluid.

Referring now to Fig. 2, the upper and lower portions of the valve shown in that figure are identical with those of Fig. 1 and corresponding parts have therefore been assigned the same numerals in both figures. The normal thermostatic operation of the valves of Figs. 1 and 2 is the same, as well as the means at the top of the structures for adjusting the thermostatic setting and for permitting over-travel of the upper bellows under abnormal temperature and pressure conditions. The only difference between the two forms of valve lies in the means for locking the valve means in one position in the event of substantial leakage of the thermostatic fluid, as was described in the preceding paragraph in connection with the structure of Fig. 1. In the arrangement of Fig. 1 the locking operation is performed manually, whereas by the arrangement of Fig. 2 the locking occurs automatically.

In Fig. 2 the finned cylinder, indicated by the numeral 24', is slightly modified by enlargement of the bore of the lower half thereof. Abutting the shoulder formed by this enlargement, and secured by solder in that position, is a disk 50 which forms the fixed end of an expansible-contractible metallic bellows 51 whose lower end is closed by another disk 52; the bellows being biased toward expanded position by a spring 53 compressed between the inner surfaces of its end walls.

The bellows 51 and its end walls together define an additional sealed chamber in the interior of which is air, conveniently at atmospheric pressure, or a vacuum. The movable end wall, or disk, 52 of the additional chamber is subjected to the pressure of the thermally expansive fluid in the main chamber 34, the upper disk 50 being apertured as indicated at 54 to permit communication between all parts of the main chamber. The force of spring 53 is such that under the pressures established in the main chamber within the normal thermostatic range of the valve the bellows 51 is in compressed or contracted condition; inward movement of the end wall 52 being limited by a rod 55 arranged between the walls 50 and 52 and conveniently secured to the latter. Secured to the underside of wall 52 is a hexagonal rod 56 which extends loosely through the opening 30 in the lower cylinder-member 23 and terminates within bellows 31 at a point slightly above the plane of the upper valve seat 19.

In normal operation of the valve shown in Fig. 2, the closure disk 18 is actuated into and out of engagement with its upper and lower seats to control flow through the passages of the valve casing in accordance with expansion and contraction of the fluid in the main chamber 34; bellows 51 remaining in its normal compressed condition. If this fluid is in the form of an elastic charge, the bellows end-wall 32 can continue to rise out of engagement with the closure after the same engages its upper seat 19 without altering the condition of the bellows 51 since the fluid pressure then acting on the end wall 52 of the same is still sufficient to overcome the opposing force of spring 53.

However, in the arrangement of Fig. 2 if the fluid in chamber 34 is a solid fill of liquid, when, upon cooling of the thermostatic unit, the closure disk engages its upper seat the force of spring 22 acting through the closure on the end wall of bellows 31 is released, so that at that instant the liquid in chamber 34 is no longer under pressure and the bellows 51 consequently starts to expand under the force of spring 53. However, in expanding the bellows 51 reduces the effective volume of the main chamber 34 so that the end wall 32 of bellows 31 is returned into opposition with spring 22 through the closure; the effect being that until the temperature and volume of chamber 34 again increase the closure disk remains in such close relation to its upper seat that only slight leakage past this seat can occur. It is to be observed that the working area of bellows 51 is considerably larger than that of bellows 31, so that slight expansion of bellows 51 effects relatively large expansion of bellows 31. When the valve is connected in a refrigeration system in the manner shown in Fig. 3, as will be described, the substantial stoppage of flow of refrigerant past the upper seat 19 soon results in rise of temperature of the thermostatic unit so that the closure is again operated to the position shown in the drawing.

In the event of substantial leakage of thermostatic fluid from chamber 34 of the valve of Fig. 2, the resultant reduction or elimination of the fluid pressure normally acting inwardly on the end wall 52 of bellows 51 effects full expansion of the same under the force of spring 53 so that the rod 56, through the end wall of bellows 31, forces the closure against its lower seat, in which position it remains locked.

In order to accomplish the automatic operation in the manner described in the preceding paragraph, it is obvious that the force of spring 53 must be greater than that of the closure spring 22; but because of the difference of area of the end walls of bellows 31 and 51 the fluid pressure produced in chamber 34 by the lighter spring 22 and acting on the end wall of bellows 51 is more than sufficient to maintain bellows 51 in compressed condition during normal thermostatic operation of the valve.

It is to be observed that automatic locking of the valve will also occur in the event of rupture of bellows 51 since, due to the resultant equalization of fluid pressure on both sides of the end wall 52, spring 53 is then effective to move the closure disk downwardly against the weaker force of spring 22.

It follows from the foregoing description of the automatic locking operation that when, in the control of a refrigeration system, it is desired to raise the temperature setting of the thermostatic valve of Fig. 2, the refrigeration system should be shut-off until the temperature of the thermostatic unit has reached the higher setting in order to prevent false operation of the locking means as the pressure in chamber 34 is reduced (by upward adjustment of cap 35) to effect the higher setting.

In the view of Fig. 3, the legend "Thermostatic Control Valve" indicates the valve shown in either Fig. 1 or 2. The valve is here shown connected in a conventional refrigeration system adapted to pass refrigerant through the coil 60 of a cooling unit, through which unit air is circulated by a fan; both of the latter parts being indicated by legends. The cooling unit is shown, by way of example, mounted in an insulated compartment 61 of the type employed for storing meat.

The condensing unit of the system comprises a compressor 62 driven by an electric motor 63, a condenser 64, and a receiver 65. The compressor motor is provided with the usual pressure switch, indicated by a legend, which, being connected to the suction line 66 of the system, is responsive to coil and crankcase pressure and acts to initiate on-cycle of the system by starting the compressor when that pressure reaches a predetermined maximum due to rise of temperature of the cooling unit, and to stop the compressor and thereby initiate the off-cycle when the pressure falls to a predetermined minimum.

The refrigerant control system to be described in connection with Fig. 3 is particularly adapted for use in a refrigeration system of the multi-cooling-unit type, and therefore additional pipes 68 and 69 are shown connected respectively to the suction line 66 and high-pressure line 67; the pipes 68 and 69, it is to be assumed, leading to other cooling units similar to the one shown.

Ahead of the cooling unit in compartment 61 is an expansion valve, indicated by the legend, which may be of the conventional type which comprises valve means operatively connected to a diaphragm, one side of which is subjected to the pressure (acting in a direction to close the valve means) at the outlet of the valve (and inlet of the evaporator coil), and whose other side is subjected to the pressure (acting in a direction to open the valve means) produced by a charge of refrigerant contained in a thermal bulb 70 connected to the valve by a capillary tube 71; a spring, whose force determines the superheat setting of the valve, biasing the valve means toward closed position. An expansion valve of this general character is disclosed in my Patent No. 2,327,542, issued August 24, 1943. The thermal bulb 70 is shown attached by apertured straps 72 to the suction line 66 at the outlet of coil 60 in the usual manner.

The thermostatic control valve is shown connected by its inlet fitting 15 to the outlet of the expansion valve; the main outlet of the thermostatic valve being connected to a pipe 73 which forms the inlet of coil 60. From the supplemental outlet of the thermostatic valve (indicated in Figs. 1 and 2 at 43) a tube 74 extends in thermal transfer relation to the thermal bulb 70, the tube forming a loop around the bulb and being connected at its outlet and to the additional passage, indicated at 44 in Figs. 1 and 2, of the thermostatic valve.

It will be observed that the thermostatic valve is shown in Fig. 3 connected at the outlet of the expansion valve, instead of ahead of it as is customary in a conventional system employing a solenoid valve controlled by a thermostatic switch. In the system of this invention, when the temperature of the cooling unit is above that desired the thermostatic valve is in the condition shown in Figs. 1 and 2 so that refrigerant can pass substantially unrestrictedly to the cooling unit.

With fall of temperature of the cooling unit and corresponding fall of temperature of the air circulating past the thermostatic valve in the space or compartment 61, the fluid in chamber 34 contracts so that the closure disk 18 rises into engagement with its upper seat, thereby obstructing direct flow of refrigerant to the evaporator coil. The lower seat 21 of the valve being uncovered, expanding refrigerant issuing from the expansion valve passes through the tube 74 in thermal transfer relation to the thermal bulb 70 so that the resultant cooling of the same effects prompt closing of the expansion valve. The amount of refrigerant passed through tube 74 to effect closing of the expansion valve is small and obviously has little effect upon the system. According to this invention, the outlet end of tube 74 could be connected to the suction line at the outlet of coil 60, but by passing the refrigerant from tube 74 to the inlet of the coil, as shown, its effect is not wasted.

In the event of reopening of the expansion valve while the thermostatic valve is in condition to divert refrigerant flow to the supplemental outlet, prompt reclosing of the expansion valve is effected by the refrigerant passing through tube 74. With rise of temperature in the compartment 61 the thermostatic valve will again be in condition to pass refrigerant directly to the cooling unit. In the control of a refrigeration system in the manner described, it is not essential for proper operation of the system that the closure of the thermostatic valve seat tightly, since slight leakage of refrigerant past the upper or lower seat would have but negligible effect on the system.

In the control of a refrigeration system of the type disclosed, the thermally expansive fluid in the thermostatic valve is preferably in the form of a "solid" fill of liquid, since in that form it is affected less than an elastic charge of fluid would be by refrigerant pressures normally occurring in the system. However, in the event of establishment of excessive refrigerant pressure, as, for example, may occur after defrosting when refrigerant is passed to a relatively-warm cooling unit, the pressure of the refrigerant acting on bellows 31 effects upward movement of the closure and resultant closing of the expansion valve due to passage of refrigerant through tube 74, so that possible overloading of the compressor is averted.

In the event of substantial leakage of fluid from the thermostatic chamber of the valve, the valve is locked in one position, either manually or automatically as described in connection with Fig. 1 and Fig. 2 respectively; the system then being in a safe condition, i. e., one in which the cooling is continued so that spoilage of the contents of the compartment is prevented, even although an unnecessarily low temperature may result.

The words "coil" and "tube," as employed in the claims, are intended to include any means constituting an equivalent passage for the refrigerant in the cooling unit, and in thermal transfer relation to the thermostatic means of the expansion valve, respectively.

The specific embodiments of my invention herein shown and described are obviously susceptible of modification without departing from the spirit of the invention, and I intend therefore to be limited only by the scope of the appended claims.

I claim as my invention:

1. In a refrigeration system: a unit for cooling a space and comprising an evaporator coil; means for passing refrigerant through said coil; an expansion valve for controlling passage of said refrigerant, and comprising means responsive to the temperature at the outlet of said coil for controlling the operation of this valve so that it closes with fall of temperature; means constituting a pipe connecting the outlet of said expansion valve to the inlet of said coil; and means for controlling the operation of the expansion valve, comprising a tube connected at one of its ends to said pipe and extending in thermal-transfer relation to said coil-temperature responsive means, the other end of said tube being so connected to the system that refrigerant in the tube returns to the system; an additional valve for controlling flow through said tube of refrigerant entering said pipe when the expansion valve is open, and means responsive to the temperature of said space for operating said additional valve to open position with fall of space-temperature so that the refrigerant then passing through said tube in thermal-transfer relation to said coil-temperature responsive means effects closing of said expansion valve.

2. In a refrigeration system: a unit for cooling a space and comprising an evaporator coil; means for passing refrigerant through said coil; an expansion valve for controlling passage of said refrigerant, and comprising means responsive to the temperature at the outlet of said coil for controlling the operation of this valve so that it closes with fall of temperature; means constituting a pipe connecting the outlet of said expansion valve to the inlet of said coil; and means for controlling the operation of the expansion valve, comprising an additional valve in said pipe and having an inlet, a main outlet leading to said coil, a supplemental outlet, as well as means operable to direct flow from said inlet either to said main outlet or to said supplemental outlet, a tube connected at one of its ends to said supplemental outlet and extending in thermal-transfer relation to said coil-temperature responsive means, the other end of said tube being so connected to the system that refrigerant in the tube returns to the system, and means responsive to the temperature of said space for so operating said additional valve as to direct flow of refrigerant therethrough to said supplemental outlet with fall of space-temperature, whereby when said expansion valve is open the refrigerant then passing through said tube in thermal-transfer relation to said coil-temperature responsive means effects closing of the expansion valve.

3. A refrigeration system as defined in claim 2 and including means so connecting the other end of said tube in the system that the refrigerant from the tube passes into said evaporator coil.

4. In a refrigeration system: a unit for cooling a space and comprising an evaporator coil; means for passing refrigerant through said coil; an expansion valve for controlling passage of said refrigerant into said coil, and comprising means responsive to the temperature at the outlet of the coil for controlling the operation of this valve so that it closes with fall of coil-outlet temperature; an additional valve for controlling flow from said expansion valve to said coil and having an inlet, a main outlet leading to the coil, a supplemental outlet, and valve means operable to direct flow from said inlet either to said main outlet or to said supplemental outlet; a tube connected at one of its ends to said supplemental outlet and extending in thermal-transfer relation to said coil-temperature responsive means, the other end of said tube being so connected to the system that refrigerant in the tube returns to the system; and a thermostatic device, responsive to the temperature of said space, for so operating said valve means as to direct flow of refrigerant to said supplemental outlet when said space temperature falls below a predetermined degree, whereby when said expansion valve is open the refrigerant then passing through said tube in thermal-transfer relation to said coil-temperature responsive means effects closing of the expansion valve, said thermostatic device comprising means defining a sealed chamber containing thermally expansive fluid and having a wall movable in accordance with the expansion and contraction of said fluid for operating said valve means.

5. A refrigeration system as defined in claim 4, and including means operable in the event of leakage of said thermally expansive fluid for locking said movable wall in a position wherein flow through said additional valve is directed to said main outlet.

6. A refrigeration system as defined in claim 4, and including means operable in the event of leakage of said thermally expansive fluid for locking said movable wall in a position wherein flow through said additional valve in directed to said main outlet; said locking means comprising an additional movable wall for said thermostatic chamber, means accessible at the exterior of the thermostatic device for moving said additional wall, and a mechanical interconnection for said movable walls whereby movement of the additional wall can effect movement of said first-mentioned movable wall to its locked position.

7. A refrigeration system as defined in claim 4, and including a device comprising an additional movable wall arranged so that it is subjected on one side to the pressure of said thermally expansive fluid, a mechanical connection whereby movement of said additional wall in a direction opposing the pressure of said thermally expansive fluid can effect movement of said valve-means-operating wall to a position wherein flow through said additional valve is directed to said main outlet, and means so biasing said additional wall in said direction as to automatically effect movement of the same in that direction in the event of reduction of pressure of the thermally expansive fluid due to substantial leakage thereof.

8. In a thermostatic valve: a casing having a passage therethrough; valve means in said casing for controlling flow through said passage; means mounted on said casing and defining a sealed chamber; a charge of thermally expansive fluid in said chamber; said chamber-defining means having a first wall, closing an opening in said casing communicating with said passage, movable in accordance with the expansion and contraction of said fluid to operate said valve means; a second movable wall forming, at the exterior of said casing, part of said chamber-defining means; said second wall being movable in a direction to relieve excess pressure in said chamber; a spring opposing movement of the second wall in said direction; stop means normally preventing movement of the second wall in an opposite direction; a mechanical interconnection for said movable walls; and manually-operable means for moving said second wall in said opposite direction so as to effect, through said mechanical interconnection and said first wall, operation of said valve means; said mechanical interconnection being so arranged that it is inoperative in normal thermostatic operation of the valve means.

9. In a thermostatic valve: a casing having a passage therethrough; valve means in said casing for controlling flow through said passage; means mounted on said casing and defining a sealed chamber; a fill of thermally expansive liquid in said chamber; said chamber-defining means having a first wall, closing an opening in said casing communicating with said passage, movable in accordance with the expansion and contraction of said liquid to operate said valve means; a second movable wall forming, at the exterior of said casing, part of said chamber-defining means; said second wall being movable in a direction to relieve excess pressure in said chamber; a spring opposing movement of the second wall in said direction; stop means normally preventing movement of the second wall in an opposite direction; manually-operable means for moving said second wall independently of said stop means so as to vary the capacity of said chamber and thereby adjust the thermostatic setting of the valve; and a mechanical interconnection for said movable walls whereby, in the event of substantial leakage of said liquid, movement of said second wall in said opposite direction can effect, through said mechanical interconnection and said first wall, operation of said valve means; said mechanical interconnection being so arranged that it is inoperative in normal thermostatic operation of the valve means.

10. A thermostatic valve as defined in claim 9, and wherein said movable walls are disposed opposite each other, and said mechanical interconnection comprises a rod arranged between the walls and of a length less than the distance between the walls in the normal thermostatic range of the valve.

11. In a thermostatic valve: a casing having a passage therethrough; valve means in said casing for controlling flow through said passage; a tubular member mounted on said casing and defining a sealed chamber; a charge of thermally expansive fluid in said chamber; said tubular member having at one end a wall, closing an opening in said casing communicating with said passage, movable in accordance with the expansion and contraction of said fluid to operate said valve means, the tubular member having at its other end another wall normally movable only in a direction to relieve excess pressure in the chamber and biased against movement in that direction; a sealed expansible-contractible bellows member within said tubular member and containing an elastic fluid at low pressure, said bellows member being closed at both ends and secured by one of its ends to the tubular member, the bellows member being submerged in the fluid in the chamber; the other end of the bellows member being movable, facing said movable wall, and having means operatively engageable therewith; and a spring in said bellows member urging said movable end of the same in the direction of said movable wall but with a force insufficient to overcome the opposing pressure of said fluid occurring within the normal thermostatic range of the valve, said spring acting, only in the event of reduction of pressure of the fluid due to substantial leakage thereof, to effect outward movement of said movable end of the bellows member and thereby, through said movable wall, operation of said valve means to a predetermined position.

HAROLD J. MATTESON.

References Cited in the file of this patent

UNITED STATES PATENTS

| Number | Name | Date |
|---|---|---|
| 2,056,401 | Hoesel | Oct. 6, 1936 |
| 2,133,963 | McCloy | Oct. 25, 1938 |
| 2,301,283 | Johnson et al. | Nov. 10, 1942 |
| 2,353,240 | Huggins | July 11, 1944 |
| 2,387,793 | Holmes | Oct. 30, 1945 |
| 2,471,448 | Platon | May 31, 1949 |